United States Patent
Rindfuss et al.

(10) Patent No.: US 8,885,066 B2
(45) Date of Patent: Nov. 11, 2014

(54) SYSTEM AND METHOD FOR DIFFERENTIATING SUBJECTS USING A VIRTUAL GREEN SCREEN

(75) Inventors: Robert Rindfuss, Orlando, FL (US); William Kennedy Neville, Oak Park, CA (US); Lars Erich Norpchen, Pacifica, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1220 days.

(21) Appl. No.: 12/384,125

(22) Filed: Mar. 31, 2009

(65) Prior Publication Data

US 2010/0208129 A1 Aug. 19, 2010

Related U.S. Application Data

(60) Provisional application No. 61/207,630, filed on Feb. 13, 2009.

(51) Int. Cl.
| | |
|---|---|
| *H04N 5/262* | (2006.01) |
| *H04N 5/222* | (2006.01) |
| *H04N 5/272* | (2006.01) |
| *G06K 9/20* | (2006.01) |
| *H04N 9/75* | (2006.01) |

(52) U.S. Cl.
CPC .............. *H04N 5/272* (2013.01); *G06K 9/2018* (2013.01); *G06K 9/2027* (2013.01); *H04N 9/75* (2013.01)
USPC .......................................... 348/239; 348/370

(58) Field of Classification Search
USPC ................. 348/239, 370–371, 586–587, 592; 396/1–4; 382/195
See application file for complete search history.

(56) References Cited

U.S. PATENT DOCUMENTS

| | | |
|---|---|---|
| 5,751,885 A | 5/1998 | O'loughlin |
| 5,946,444 A | 8/1999 | Evans |
| 6,425,825 B1 | 7/2002 | Sitrick |

(Continued)

FOREIGN PATENT DOCUMENTS

| | | |
|---|---|---|
| WO | WO 2007/071954 | 6/2007 |
| WO | WO 2008/127598 | 10/2008 |

OTHER PUBLICATIONS

Hughes, et al., "Mixed Fantasy: An Integrated System for Delivering MR Experiences," VR Usability Workshop: Designing and Evaluating VR Systems, Nottingham, England, Jan. 22-23, (2004).

(Continued)

*Primary Examiner* — Twyler Haskins
*Assistant Examiner* — Carramah J Quiett
(74) *Attorney, Agent, or Firm* — Farjami & Farjami LLP

(57) ABSTRACT

There is provided a method for capturing images of subjects having a first subject placed a distance in front of a second subject, comprising shining a first light on the subjects during a first period of time, wherein the first light is shone with more intensity on the first subject than the second subject; capturing a first image of the subjects during the first period of time; terminating the shining of the first light on the subjects after the capturing of the first image; shining a second light on the subjects during a second period of time after the terminating, wherein the second light is shone with more intensity on the second subject than the first subject; and capturing a second image of the subjects during the second period of time.

18 Claims, 4 Drawing Sheets

(56) References Cited

U.S. PATENT DOCUMENTS

| | | |
|---|---|---|
| 6,526,158 B1 | 2/2003 | Goldberg |
| 6,608,563 B2 | 8/2003 | Weston |
| 7,070,277 B2 | 7/2006 | Trumbull |
| 7,343,320 B1 | 3/2008 | Treyz |
| 7,365,771 B2 | 4/2008 | Kahn |
| 2003/0137597 A1* | 7/2003 | Sakamoto et al. ............ 348/371 |
| 2003/0182143 A1 | 9/2003 | Conrad |
| 2003/0189654 A1* | 10/2003 | Kage et al. .................... 348/239 |
| 2004/0008872 A1 | 1/2004 | Goldberg |
| 2004/0120009 A1* | 6/2004 | White et al. ................. 358/1.18 |
| 2006/0064731 A1 | 3/2006 | Kahle |
| 2007/0035561 A1 | 2/2007 | Bachelder |
| 2007/0078013 A1 | 4/2007 | Simmons |
| 2008/0060004 A1 | 3/2008 | Nelson |
| 2008/0226273 A1* | 9/2008 | Kaku ................................ 396/3 |
| 2008/0246777 A1* | 10/2008 | Swanson et al. .............. 345/640 |
| 2008/0251575 A1 | 10/2008 | Bowling |
| 2008/0252749 A1* | 10/2008 | Fujiwara .................... 348/224.1 |
| 2008/0270922 A1 | 10/2008 | Kii |

OTHER PUBLICATIONS

Hu, et al., "Robust background subtraction with shadow and highlight removal for indoor surveillance", EURASIP Journal on Applied Signal Processing, vol. 2007, Issue 1, (Jan. 2007).

* cited by examiner

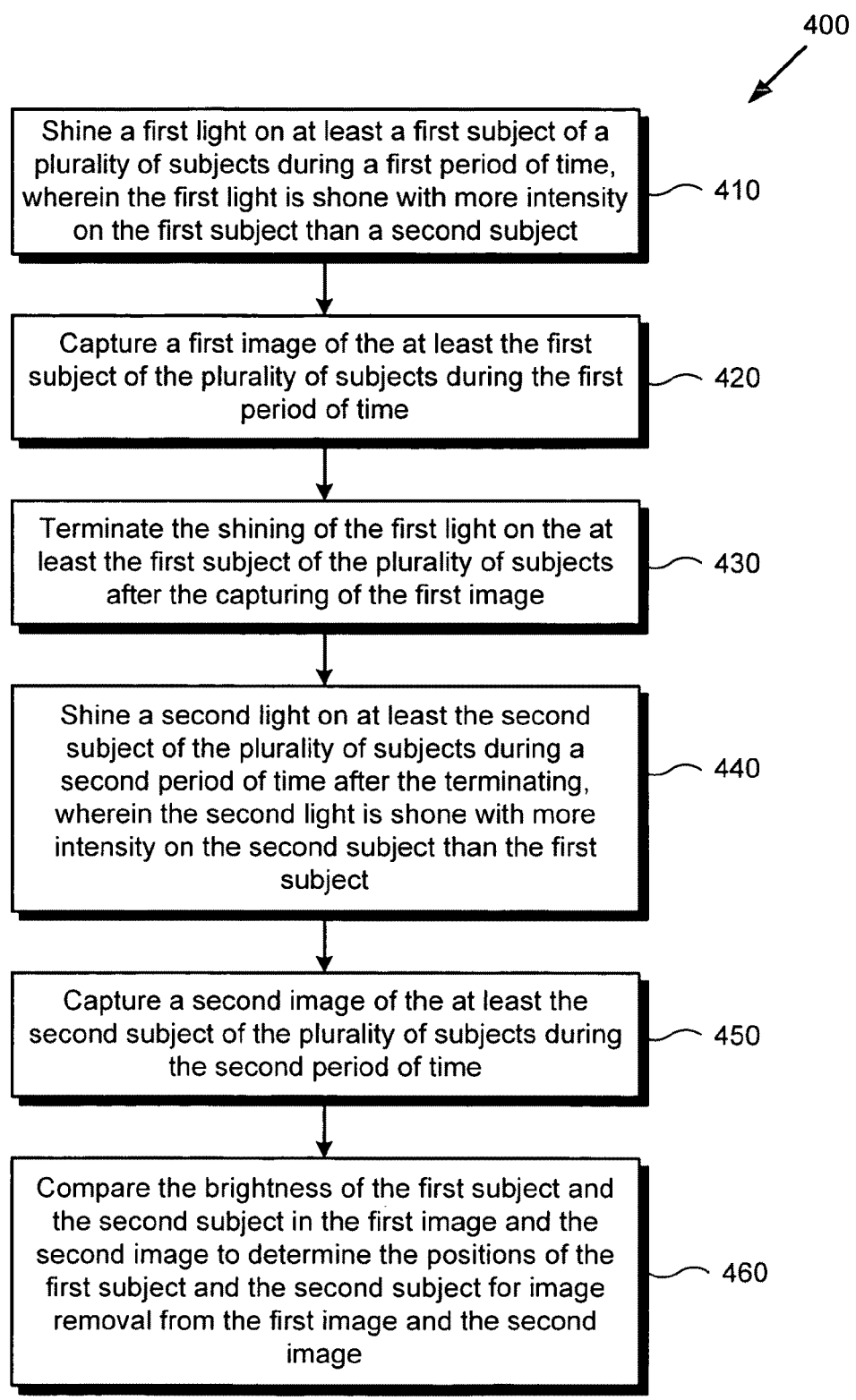

SYSTEM AND METHOD FOR DIFFERENTIATING SUBJECTS USING A VIRTUAL GREEN SCREEN

RELATED APPLICATIONS

This application claims priority to U.S. Provisional Application No. 61/207,630, filed Feb. 13, 2009, which is hereby incorporated by reference in its entirety.

BACKGROUND OF THE INVENTION

1. Field of the Invention

The present invention relates generally to image processing. More particularly, the present invention relates to differentiating images.

2. Background Art

To enhance the entertainment value and enjoyment of amusement venues and other applications, it is often advantageous to provide content tailored to unique interests or characteristics of individuals or small groups. By providing content that leverages subject recognition features, highly personal interactions can be provided, customized to suit individual tastes and preferences. For example, the facial features of a user might be recognized and superimposed over the user's favorite character and printed as a souvenir, providing highly personal and lasting memories.

To provide these personalization features, the subjects of interest must often be isolated from other objects or background elements that may interfere with downstream image recognition and manipulation. Generally, this background removal process requires some level of control over the environment, so that a background having no subjects can be accurately modeled for comparing against a background including some subjects of interest. Furthermore, this process can be expedited by keeping the background static and hued differently from the predominant hues of the subjects.

The "blue-screen" and "green-screen" chroma key techniques are examples of such background removal processes. Since green or blue hues are rarely seen in natural skin pigments, they are often ideal hues for chroma key. By isolating only the subjects of interest, such as actors in motion pictures or weather anchors in news broadcasts, a more interesting background can be substituted, such as a computer generated background for a movie, or an animated weather map for a weather report. Moreover, multiple subjects can be assembled in a single scene, and other flexible transformations can provide interesting and compelling effects. For example, a common application is the modern digital photo booth seen in amusement settings. These photo booths can leverage chroma key techniques in a carefully controlled and enclosed environment to provide users with personalized prints or stickers with fun and decorative composited backgrounds.

Thus, for effective use of background removal techniques such as chroma key, the environment around the subjects usually requires a high degree of control and regulation. For example, the area behind the subjects of interest must typically include a painted wall or some other structure to provide a color hue matching a particular chroma key technique being used, and lighting must be carefully managed to avoid jarring shadow artifacts or other anomalies. In addition, since chroma key techniques are typically used in conjunction with video capture providing only two-dimensional image frames, subject distances or depth relative to a camera must be typically determined in advance and strictly regulated, or special markers must be physically inserted into the scene area to act as scaling guideposts. Otherwise, improper spatial attribution for subjects or incorrect subject scaling may occur at the composition stage.

However, in an amusement park or other public venue, particularly where many people may be situated close together, possibly without strict placement control, it may be difficult to determine subject depth correctly. The additional variables of subject ages, heights, and body compositions may further confound attempts at estimating subject depth from two-dimensional images provided by standard video cameras. Thus, due to many practical difficulties in arranging a suitable working environment, traditional background removal techniques such as chroma key have seen limited opportunities for deployment in public settings, even though tremendous benefits can be realized in the form of personalization and other enabled effects.

Accordingly, there is a need to overcome the drawbacks and deficiencies in the art by providing a way to achieve the results of blue or green screen chroma key techniques for depth sensitive subject isolation from backgrounds without requiring a traditional chroma key environmental setup.

SUMMARY OF THE INVENTION

There are provided systems and methods for differentiating subjects using a virtual green screen, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 4 shows a flowchart describing the steps, according to one embodiment of the present invention, by which a control/processing module can capture images of a plurality of subjects for differentiating subjects using a virtual screen.

DETAILED DESCRIPTION OF THE INVENTION

The present application is directed to a system and method for differentiating rows of subjects by virtual green screen. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
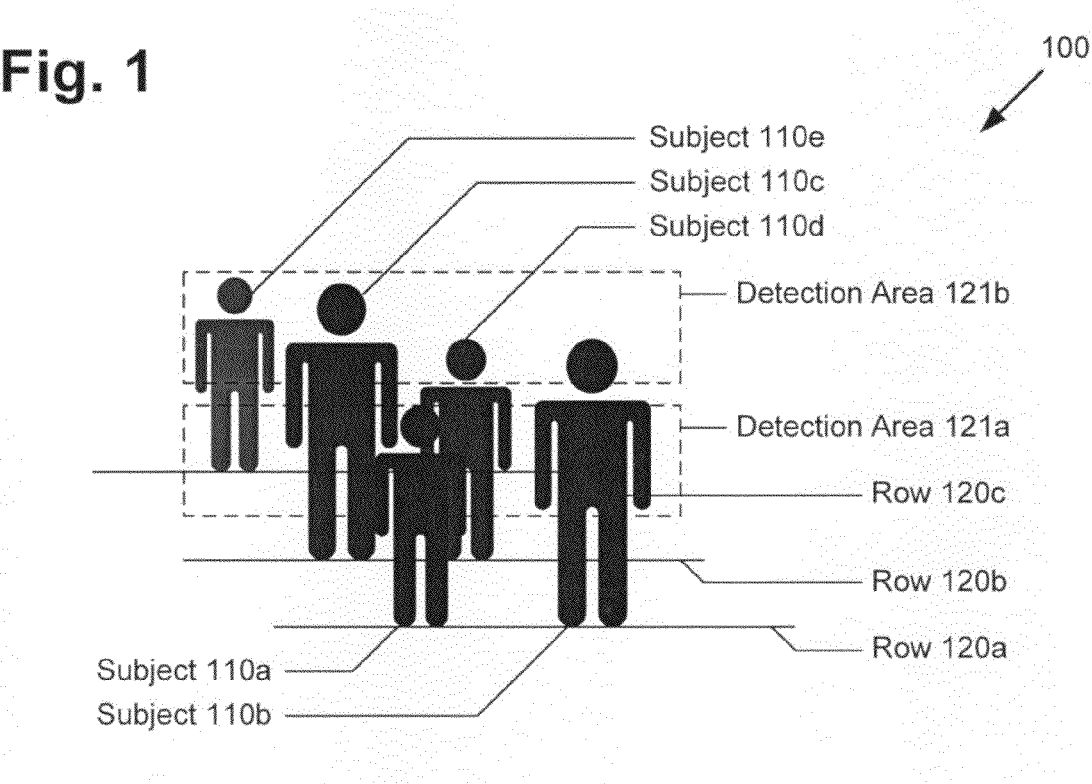
FIG. 1 presents a simulated image depicting subjects for image processing, according to one embodiment of the present invention.

FIG. 1 presents a simulated image depicting subjects for image processing, according to one embodiment of the present invention. Image 100 of FIG. 1 includes subjects 110a-110e, rows 120a-120c, and detection areas 121a-121b. Subjects 110a-110b are depicted in front, standing on row 120a. Subjects 110c-110d are depicted behind subjects 110a-110b, standing on row 120b. Subject 110e is depicted behind subjects 110c-110d, standing on row 120c.

If image 100 of FIG. 1 is captured at a location with standard camera equipment, image 100 may comprise a two-dimensional bitmap image without having any additional depth information. Thus, alternative methods may be necessary to determine the depth, distance, or spatial position of each subject from image 100. One simple approximation is simply partitioning image 100 into two-dimensional areas and determining depth or distance based on whether a subject is contained within those areas. This approach may be implemented by using detection area 121a and detection area 121b, corresponding to row 120a and 120b, respectively. For example, if a head of a subject is detected within detection area 121a, then it might be concluded that the subject is standing on row 120a. Correspondingly, if a head of a subject detected within detection area 121b, then it might be concluded that the subject is standing on row 120b.

While this simplistic area matching method may suffice if each subject is uniform, problems with this method are quickly exposed once subjects of varying characteristics are introduced, as in image 100. Since subject 110b is exceptionally tall, the head of subject 110b is primarily contained within detection area 121b, which would result in misattributing subject 110b to row 120b, even though subject 110b is standing on row 120a. Similarly, although not shown in image 100, if a short child subject is standing on row 120b, the child subject may be misattributed to row 120a, since the child's head will probably fall within detection area 121a. Additionally, as distances extend further outwards, the ability to cleanly partition image 110 into discrete detection areas decreases, since far away subjects become proportionally smaller and harder to distinguish. This is shown by subject 110e being included within detection area 121b, misattributing subject 110e to row 120b, even though subject 110e is actually standing on row 120c.

Without the ability to accurately gauge the spatial location of each subject in image 100, it becomes difficult to provide fully customized experiences for each subject. For example, each row might deliver a particular customized experience based on feedback solicited from subjects standing on the row. If subjects are misattributed to the wrong rows, then the customized experiences will also be misattributed as a result, leading to confusion and dismay. Other location-based customization techniques will also fail without a reliable way to determine subject position. To remedy this problem, a reliable way to differentiate rows of subjects is necessary, as further described below.

Figure 2:
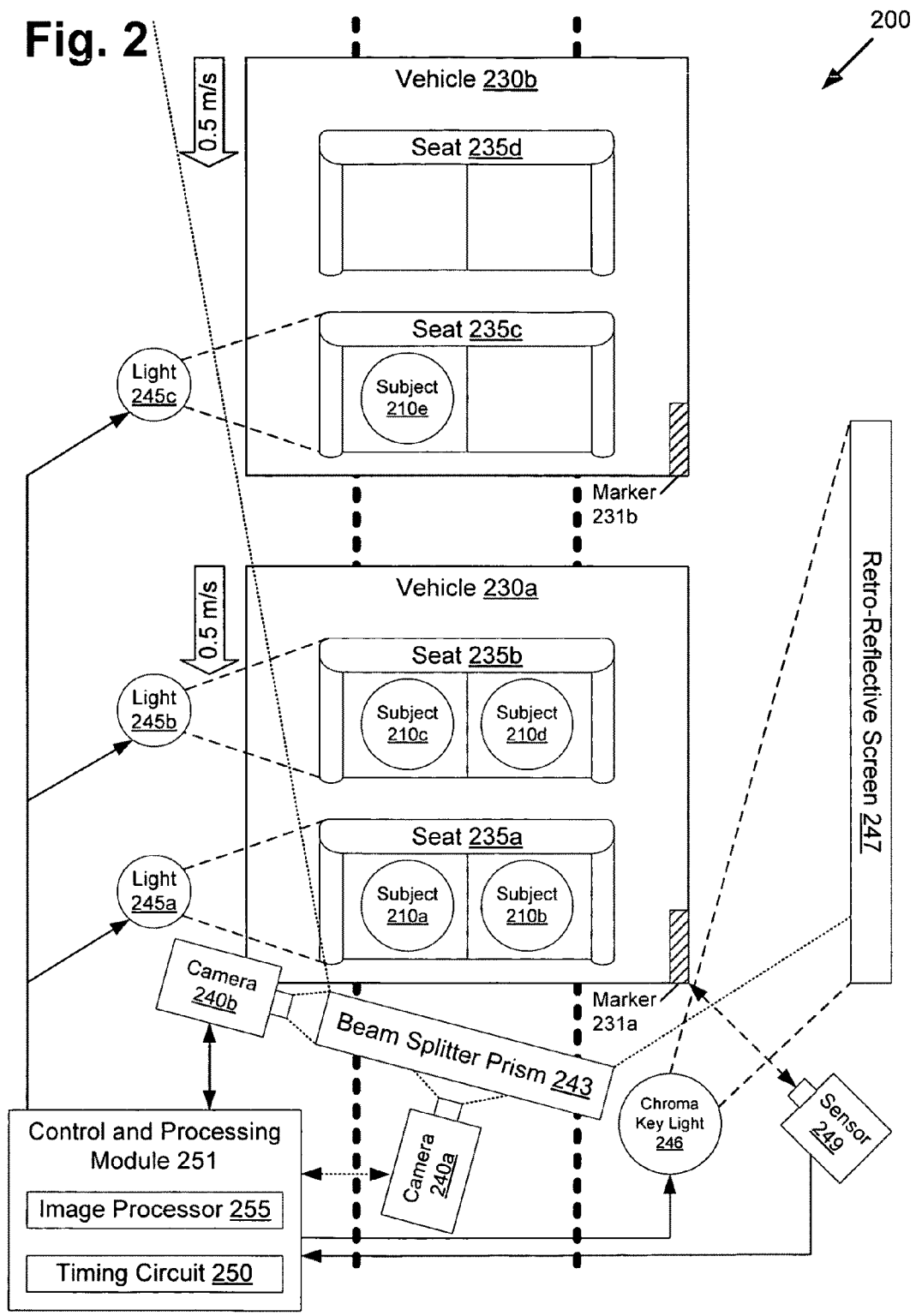
FIG. 2 presents a block diagram depicting a system for differentiating subjects, according to one embodiment of the present invention.

FIG. 2 presents a block diagram depicting a system for differentiating subjects, according to one embodiment of the present invention. Environment 200 of FIG. 2 includes vehicles 230a-230b, cameras 240a-240b, lights 245a-245c, beam splitter prism 243, chroma key light 246, retro-reflective screen 247, sensor 249, and control/processing module (CPM) 251. Vehicle 230a includes seat 235a seating subjects 210a-210b, seat 235b seating subjects 210c-210d, and marker 231a. Vehicle 230b includes seat 235c seating subject 210e, seat 235d, and marker 231b. CPM 251 includes image processor 255 and timing circuit 250. Additionally, with respect to FIG. 2, it should be noted that subjects 210a-210e correspond to subjects 110a-110e from FIG. 1.

Environment 200 of FIG. 2 depicts an abstracted overhead view of a rail guided amusement ride supporting multiple vehicles seating multiple subjects. As shown in FIG. 2, vehicles 230a-230b are moving at 0.5 meters per second, which is slow enough to discount the effects of motion for the purposes of cameras 240a-240b. In alternative embodiments, the subjects captured by cameras 240a-240b may also be stationary, or moving at a faster rate with motion compensation or fast shutter cameras.

As each vehicle progress through the ride, sensor 249 is configured to detect the presence of a marker positioned on the side of each vehicle. Sensor 249 might comprise, for example, an optical retro-reflective sensor assembly that emits a light to marker 231a, which may comprise a square of reflective tape or some other suitable marker. Marker 231a reflects the light back to sensor 249, which can then be sensed to indicate the presence of vehicle 230a at a predetermined position. In the case of vehicle 230a, once marker 231a is detected by sensor 249, a trigger signal may be sent to timing circuit 250 of CPM 251 for commencing camera and lighting operations. After vehicle 230a has moved farther down the ride and vehicle 230b takes its place, sensor 249 can operate in a similar fashion for marker 231b.

Once timing circuit 250 receives the trigger signal as described above, it can initiate a sequence of operations to capture images of subjects 210a-210d to transfer to image processor 255 for further downstream processing, as described in FIG. 3 below. Cameras 240a-240b are both configured to focus on beam splitter prism 243 to capture an image from the same line of sight. As shown in environment 200, the line of sight may be tilted at an angle, for example 30 degrees to the right, to allow subjects 210c-210d to be seen more easily without subjects 210a-210b obstructing the view. Thus, although camera 240b is positioned to the side, the lens of camera 240b may receive an image with a line of sight similar to that of camera 240a, as if camera 240b were actually positioned where camera 240a is. Beam splitter prism 243 thus operates as an optical splitter to provide cameras 240a-240b with approximately equal lines of sight for image capture. This may help to accelerate image processing at image processor 255, since image displacement correction and other preprocessing procedures to correct defects that may arise from differing lines of sight can be simplified or largely eliminated.

While a single camera, camera 240a, might also be used for environment 200, various practical limitations may constrain the use of only a single camera for image capturing duties. For example, a processor embedded within camera 240a may lack the performance necessary for processing the pixels of multiple images within a limited time window. Embedded storage within camera 240a may also lack the necessary write bandwidth for saving a rapid succession of images. Interface cabling between camera 240a and CPM 251 may provide insufficient bandwidth for transferring multiple images to image processor 255 before sensor 249 sends a new trigger signal to timing circuit 250 indicating that camera 240a needs to capture a new set of images. On the other hand, with multiple cameras, greater parallelism can be achieved, thus relaxing timing requirements for individual equipment. As a result, standard commodity hardware can be used, reducing costs of implementation and maintenance.

Moving to the lighting hardware, lights 245a-245c may comprise, for example, standard xenon strobe lights, high intensity industrial LED arrays, or other equipment for generating light. Lights 245a-245c may also include on/off switches and/or dimmable illumination levels controllable by timing circuit 250. Light direction and focus may further be tightly controlled using equipment such as conventional photographic grids. In conjunction with the photographic grids, timing circuit 250 can then control lights 245a-245c to focus light on particular subjects, or to focus light on a row of subjects sitting in a particular seat. Although environment 200 only depicts lights positioned to the left of the vehicles for diagram simplicity, other embodiments may include many more lights positioned around the vehicles to provide flexible illumination control. For example, lights positioned to the right of the vehicles may provide illumination from the right side, and overhead lights may provide illumination from the top and from the front. In one embodiment, there may be three sets of left wall mounted circular LED array strobes to provide illumination from the left for each of seats 235a-235b, five sets of right wall mounted circular LED array strobes to provide illumination from the right for each of seats 235a-235b, two sets of overhead linear LED lights to provide illumination from above and in front for each of seats 235a-235b, and a large linear LED array strobe with four smaller strobes to strobe vehicle 230b for camera 240a.

Moreover, chroma key light 246 can be used to illuminate background elements, such as the area behind vehicle 230a, in a particular color hue, so that image processor 255 can utilize traditional chroma key techniques with the color hue for background removal. Retro-reflective screen 247 may reflect the light provided by chroma key light 246 in a focused manner back to beam splitter prism 243, so that retro-reflective screen 247 is visible to cameras 240a-240b, but largely invisible to subjects 210a-210d. To provide greater confidence in determining background for chroma key, different images might utilize different color hues to provide extra security against false positives, such as subjects with clothing or eyes having the same color hues as the chroma key.

To provide images for image processor 255 suitable for differentiating rows of subjects, timing circuit 250 can direct cameras 240a-240b and lights 245a-245c to capture images where the subjects for each row or seat are illuminated brighter for a particular image relative to other images. For environment 200, this may include a first image where subjects 210a-210b sitting in seat 235a are brightly illuminated, and a second image where subjects 210c-210d sitting in seat 235b are brightly illuminated.

It should be noted that the illumination levels are being judged relative to other images, rather than as an absolute level. Thus, for example, subjects 210c-210d can still be somewhat illuminated in the first image, as long as subjects 210c-210d are brightly illuminated in the second image compared to the first image. A greater difference in illumination between the two images may allow image processor 255 to decide row determination with higher confidence. Such a greater difference in illumination may be easily accomplished indoors within light controlled environments, or outdoors during nighttime hours. For outdoors environments or other situations where visible light is difficult to control, other embodiments may utilize different types of light such as non-visible infrared light. To further differentiate rows of subjects, in some embodiments, supplemental spatial recognition techniques may also be utilized. To give an example using environment 200, timing circuit 250 may firstly direct light 245a to shine primarily on subject 210a-210b of seat 235a, secondly direct camera 240a to capture the first image of vehicle 230a, thirdly turn off or dim light 245a, fourthly turn on light 245b to shine primarily on subject 210c-210d of seat 235b, and fifthly direct camera 240b to capture the second image of vehicle 230a. Additionally, light 245c might also be utilized to illuminate parts of the trailing vehicle, vehicle 230b, so that it may be more easily removed. For example, by using the virtual green screen technique described in this application with an additional third camera, vehicle 230b can be easily removed from images captured by cameras 240a-240b. Additionally, if height differences between images captured by cameras 240a-240b for subjects sitting in seat 235a and seat 235c are unambiguous, then the third camera may be unnecessary, and subjects may be differentiated by simply partitioning the images, which essentially substitutes for the functionality of the third camera. Light 245c may also aid in the application of more traditional chroma key techniques. Vehicle 230b, including subject 210e, can then be captured at a later point in time, when marker 231b is detected by sensor 249.

Before vehicle 230b arrives to replace vehicle 230a, light 245b should be turned off or dimmed, so that newly captured images have proper lighting conditions. To avoid uncomfortable lighting conditions for subjects 210a-210d, and to minimize the motion effects of vehicle 230a moving at 0.5 meters per second, the entire capturing process described above may take place within several milliseconds (ms), so that the subjects perceive only a momentary flash. For example, each light may individually shine for an 8 ms period of time, with a 4 ms time gap between lighting transitions to avoid capturing an image where both lights 245a-245b are shining.

The time lengths used as examples above may be adjusted in alternative embodiments, but shorter time lengths may be preferable for minimizing subject motion and visual discomfort for the subjects, at least to the extent that the image capturing process is not compromised as a result. For example, a very short time gap between lighting transitions may result in uneven or irregular lighting conditions for image capture, and a very short light illumination time may compromise the ability of each camera to complete a full image capture with ideal lighting conditions. For example, if certain lighting is utilized, some time may be required for reaching the optimal brightness levels. Moreover, larger time periods may provide additional flexibility for accommodating timing errors and equipment performance variances. Thus, time lengths may need adjustments based on the particular requirements of an application.

As a result of the process described above, cameras 240a-240b can provide image processor 255 with image captures suitable for differentiating rows of subjects. Image processor 255 may be configured to periodically poll cameras 240a-240b for newly captured images, or cameras 240a-240b may send the images to image processor 255 as soon as they are stored to local memory. If wiring constraints prevent the practical use of direct physical connections, wireless transmission methods might be utilized for sending the images to image processor 255. Image processor 255 can then receive the images for further processing to differentiate subjects by rows or seats, as described in FIG. 3 below.

Figure 3:
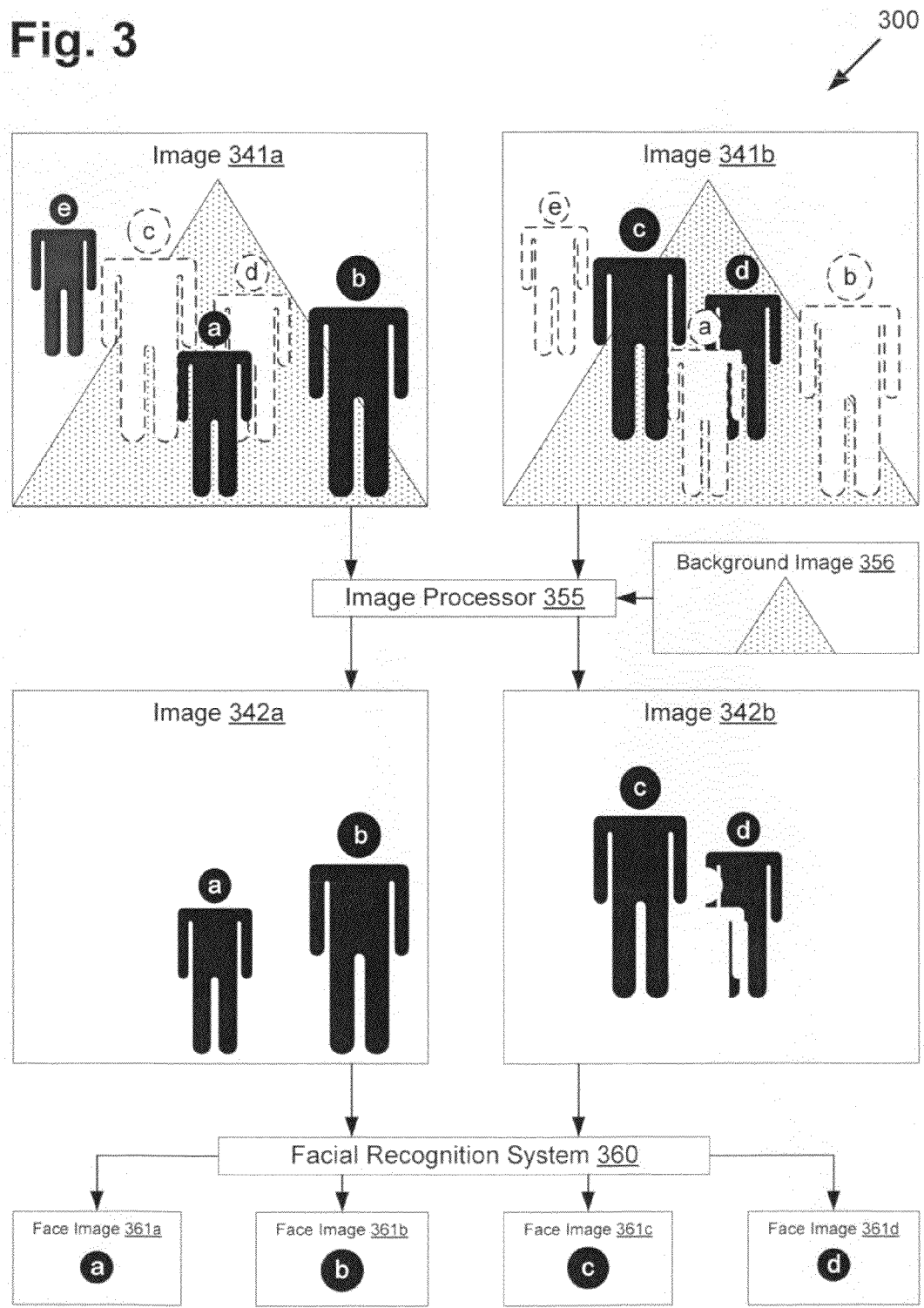
FIG. 3 presents a block diagram showing image processing for differentiating subjects, according to one embodiment of the present invention.

FIG. 3 presents a block diagram showing image processing for differentiating subjects, according to one embodiment of the present invention. Diagram 300 includes images 341a-341b, images 342a-342b, image processor 355, background image 356, facial recognition system 360, and face images 361a-361d. Additionally, with respect to FIG. 3, it should be noted that subjects depicted in images 341a-341b and 342a-342b correspond to subjects 210a-210e from FIG. 2, that image processor 355 corresponds to image processor 255, and that a background depicted in background image 356 corresponds to seats 235a-235d, vehicles 230a-230b, and other background elements of environment 200.

Continuing with the example environment 200 used in FIG. 2, image 341a may correspond to the first image captured by camera 240a, and image 341b may correspond to the second image captured by camera 240b. Subjects depicted darker or towards a black color may indicate a brighter captured lighting intensity within FIG. 3. Image 341a shows subjects 210a-210b with high brightness, as the lights were directed primarily towards subjects 210a-210b during the image capture. Subjects 210c-210d are also captured with low brightness, as light spilling and other effects may render it difficult to avoid illuminating subjects 210c-210d, at least to some extent. Subject 210e is also illuminated with moderate brightness, to aid in removal of subject 210e.

Examining image 341b, where the lights were directed primarily towards subjects 210c-210d, the lighting situation is nearly reversed. Subjects 210a-210b are illuminated at very low brightness and may be difficult to discern without looking closely, whereas subjects 210c-210d are illuminated with high brightness, and subject 210e is illuminated with low brightness, again possibly due to light spilling and other effects. Image processor 355 can leverage the brightness differences between image 341a and image 341b to isolate and determine the spatial location of each subject and that one subjected is located in front of the other.

The backgrounds of images 341a-341b are abstracted as the triangle depicted in background image 356. In actuality, background image 356 may look like a picture of vehicle 230a with a trailing vehicle 230b, along with empty seats 235a-235b. Image processor 355 may then use background image 356 with traditional chroma key techniques for background removal. In that sense, background image 356 may not actually comprise an image at all, but merely a range of hue values for chroma key matching, and background elements within images 341a-341b may be colored with the same hue values. For example, background elements including seats 235a-235b and vehicles 230a-230b may be colored blue as a result of colored LED lighting or being built from specially prepared materials, and background image 356 may actually comprise a range of blue hues to match as background.

To avoid false background positives, such as, for example, a subject with blue eyes or a subject wearing a blue colored shirt, image processor 355 may further apply advanced image processing techniques to increase confidence in a background match. One such technique might involve spatial subject recognition, where the locations of subjects within the captured images can be estimated, allowing image processor 355 to avoid marking areas estimated to contain the subjects as portions of the hued background. For example, as previously discussed, chroma key techniques may be applied with multiple color hues using chroma key light 246 and retro-reflective screen 247 to estimate the spatial area of the background, helping to improve the confidence of the background matching process. This technique might also be augmented with temporal subject recognition techniques, where multiple images are taken of the subjects at different times and compared against each other. Area bounding through edge detection, flood-filling, grouping similar pixels, and other algorithms may also assist in estimating the position of subjects within the images, allowing image processor 355 to remove background image 356 with greater accuracy.

For example, examining FIG. 2, chroma key light 246 might be first configured for a green hue when camera 240a captures image 341a focusing on the front row, or seat 235a with subjects 210a-210b. Afterwards, chroma key light 246 might be changed to a blue hue when camera 240b captures image 341b focusing on the back row, or seat 235b with subjects 210c-210d. Thus, in image 341a, the background elements (shown as a triangle) may be illuminated in green, whereas in image 341b, the background elements (also shown as a triangle) may be illuminated in blue. Conventionally, traditional chroma key techniques utilize only a single hue color, such as solely green or solely blue, for background processing and removal. However, by combining images 341a-341b utilizing multiple hue colors for chroma key background removal, a higher degree of background removal accuracy and subject position estimation can be achieved that was previously difficult or impossible to achieve with traditional chroma-key techniques.

To process images 341a-341b, image processor 355 to process images 341a-341b using traditional chroma-key techniques, using a green hue for image 341a and a blue hue for image 341b. This multiple chroma-key processing provide a level of redundancy for ascertaining background information, allowing image processor 355 to double check whether a certain area should be considered background or foreground in both images 341a-341b. Pixels that are matched against both chroma-key colors in both image 341a and image 341b are highly unlikely to be false positives for foreground elements, since two separate images using different chroma-keys can confirm that the pixels are background elements. In this manner, background pixels can be more easily ascertained from false positives that should be foreground pixels, since false positive areas matching green in image 341a may be refuted as foreground pixels if the same areas do not match blue in image 341b. Similarly, false positive areas matching blue in image 341b may be refuted as foreground pixels if the same areas do not match green in image 341a. Only when both image 341a and image 341b both indicate that a certain area is matched to chroma-key, green or blue respectively for image 341a and image 341b, then image processor 355 can mark the area as background with a high degree of confidence. Although the example illustrated in FIG. 3 uses two images with different hues, this technique could be extended to multiple images and hues for an even higher degree of confidence.

Moreover, this multiple chroma-key image processing technique can be combined with flood-fill area bounding to provide even higher confidence in the background removal process. By using a flood-fill algorithm to generate a bounding mask from background image 356, the expected positioning and bounds of the background elements to be removed from images 341a-341b can be estimated. Thus, during image processing, if certain pixels happen to match to chroma-key but are outside the expected positioning and bounds, then image processor 355 can conclude those pixels to be false positives. These false positives might be due to lighting reflection effects from subjects 210a-210d, for example. In this case, image processor 355 can correctly conclude that these are actually foreground pixels, even though they may match the chroma-key hues.

In image 341a, since subjects 210a-210b are illuminated much brighter compared to subjects 210c-210e, a simple brightness filter combined with some of the techniques described above may be utilized to extract only subjects 210a-210b as image 342a, with subjects 210c-210e removed, as well as background image 356. Similarly, subjects 210c-210d can be extracted from image 341b to result in image 342b. Brightness differences of subject 210e between image 341a and image 341b can also be leveraged to spatially identify and remove subject 210e from both images 342a-342b. During these image manipulation steps, various blur filters and luminance thresholds may be utilized to reduce noise artifacts and improve the quality of subject extraction.

This virtual green screen process produces the same end result as traditional chroma key techniques, without requiring an actual physical blue or green screen background behind the subjects. Since retro-reflective screen 247 is largely invisible to subjects 210a-210d due to the retro-reflected lighting provided by chroma key light 246, there is no need for a traditionally obtrusive green-screen background to ruin the immersion. Additionally, the usage of two or more separate images with different chroma key hues increases the confidence of background pixel removal, as discussed above. Moreover, depth issues are largely resolved since images can be assigned to particular distance depths or rows in advance, as the row lighting configuration for each image is also arranged in advance. Thus, the problem of misattributing a subject to a wrong depth or row is largely eliminated. Since subjects 210a-210b are brightest in image 341a, where the lights were configured to shine brightest on seat 235a, subjects 210a-210b can be confidently assigned to seat 235a, or the first row. Similarly, since subjects 210c-210d are brightest in image 341b, where the lights were configured to shine brightest on seat 235b, subjects 210c-210d can be confidently assigned to seat 235b, or the second row. Therefore, with very little risk of misattribution, subjects appearing in image 342a may be assumed to belong to the first row, whereas subjects appearing in image 342b may be assumed to belong to the second row.

The subject row information ascertained above may be further utilized to provide fully customized experiences for each subject. For example, each seat might be equipped with a touch screen panel on the sides, allowing each subject to key in their preferences or other details. The ride depicted in FIG. 2 may, for example, solicit from each subject a favorite setting or time era. Subjects 210a-210b sitting in seat 235a might answer that they like Wild West settings, whereas subjects 210c-210d sitting in seat 235b might answer that they like futuristic settings.

With the preferences for each subject known, facial recognition system 360 of FIG. 3 may then be utilized to extract individual facial images for each subject, shown as face images 361a-361d, corresponding to subjects 210a-210d, respectively. Face images 361a-361b may then be utilized by a video generation program to superimpose the faces of subjects 210a-210b on cowboys in a Wild West themed animated clip, whereas face images 361c-361d may be utilized by the video generation program to superimpose the faces of subjects 210c-210d on astronauts in a futuristically themed animated clip. These animated clips may then be presented to the appropriate subjects during or after the ride, for example by LCD displays or projection screens, providing memorable personalized experiences. Of course, customized animated video clips are only one method of providing customization, and alternative embodiments may support other entertainment paradigms that can leverage images extracted by the virtual green screen.

Without the virtual green screen technique described above, the subjects would typically have to pose in front of an actual blue or green screen to achieve the same imaging effect, a slow process requiring laborious setup and positioning of subjects in a starkly colored and plain environment, which may greatly reduce user enjoyment and immersion. In contrast, the virtual green screen technique, once properly configured, can be largely automated and transparent to the subjects, with little more than a short flash of light to indicate its presence. This enables amusement operators to provide compelling and immersive customized experiences while reducing overhead and maintenance costs.

FIG. 4 shows a flowchart describing the steps, according to one embodiment of the present invention, by which a control/processing circuit can capture images of a plurality of subjects for differentiating subjects using a virtual green screen. Certain details and features have been left out of flowchart 400 that are apparent to a person of ordinary skill in the art. For example, a step may comprise one or more substeps or may involve specialized equipment or materials, as known in the art. While steps 410 through 460 indicated in flowchart 400 are sufficient to describe one embodiment of the present invention, other embodiments of the invention may utilize steps different from those shown in flowchart 400.

Referring to step 410 of flowchart 400 in FIG. 4 and environment 200 of FIG. 2, step 410 of flowchart 400 comprises timing circuit 250 of CPM 251 to cause a first light to shine on subjects 210a-210b with more intensity than on subjects 210c-210d during a first period of time. As previously discussed, the first period of time might comprise several milliseconds to mitigate the effects of motion on image capture and to minimize visual discomfort for the subjects. Step 410 may initiate by, for example, an external trigger signal received from sensor 249. Once timing circuit 250 receives the external trigger signal, a signal may be sent to light 245a to change to high or maximum brightness intensity, and a signal may be sent to light 245b to emit light at a lower intensity than light 245a, either by completely shutting off light 245b or by sufficiently dimming light 245b to produce a brightness difference that can be reliably discerned by image processor 255. The signals for directing lights 245a-245b can be transmitted by, for example, sending electrical trigger signals by wires, or by sending wireless trigger signals to be read by wireless receivers at each light.

Referring to step 420 of flowchart 400 in FIG. 4 and environment 200 of FIG. 2, step 420 of flowchart 400 comprises timing circuit 250 of CPM 251 to cause a first image of subjects 210a-210d to be captured during the first period of time in step 410. For example, timing circuit 250 may send a capture signal to camera 240a to initiate the process of capturing an image to be sent to image processor 255. As with step 410, the capture signal may be transmitted wired or wirelessly.

Referring to step 430 of flowchart 400 in FIG. 4 and environment 200 of FIG. 2, step 430 of flowchart 400 comprises timing circuit 250 of CPM 251 to cause a terminating of the shining of the first light from step 410 after step 420. Although terminating the first light might involve, for example, sending a signal to completely shut off light 245a, alternative embodiments may merely dim light 245a as well.

Referring to step 440 of flowchart 400 in FIG. 4 and environment 200 of FIG. 2, step 440 of flowchart 400 comprises timing circuit 250 of CPM 251 to cause a second light to shine on subjects 210c-210d with more intensity than on subjects 210a-210b during a second period of time after step 430. As previously discussed, this second period of time might occur after a short gap of time after step 430 to allow any lighting transitions to fully complete. Step 440 may be accomplished in a manner similar to step 410, except that a signal may be sent to light 245b rather than light 245a to change to high or maximum brightness intensity, and light 245a needs no further signals as it was already terminated or dimmed in step 430.

Referring to step 450 of flowchart 400 in FIG. 4 and environment 200 of FIG. 2, step 450 of flowchart 400 comprises timing circuit 250 of CPM 251 to cause a second image of subjects 210a-210d to be captured during the second period of time in step 440. Step 450 may be accomplished in a manner similar to step 420, except that the capture signal is sent to camera 240b rather than camera 240a.

Referring to step 460 of flowchart 400 in FIG. 4 and environment 200 of FIG. 2, step 460 of flowchart 400 comprises image processor 255 of CPM 251 comparing the brightness of subjects 210a-210b and 210c-210d in the first image from step 420 and the second image from step 450 to determine the positions of subjects 210a-210d for image removal from the first and second image. Step 460 can be accomplished using the virtual green screen technique described above, where brightness differences between the first image and second image can be leveraged by image processor 255 to determine the locations of subjects 210a-210d for removal from the first image and the second image. Additionally, traditional chroma key techniques can be used to remove other background elements such as vehicles 230a-230b and seats 235a-235d, to provide a cleaner removal of each subject. Once images of subjects 210a-210d are removed and their positions are determined, any manner of customized experiences can be provided for subjects 210a-210d, such as personalized animated video clips with superimposed subject heads, as discussed above. The virtual green screen implemented in steps 410-460 can provide these experiences without requiring the laborious and intrusive setups of traditional chroma key blue or green screens.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. An image capturing method for capturing images of a plurality of persons having a first person in a first row seat of a vehicle placed a distance from a second person in a second row seat of the vehicle, the method comprising:
    shining a first light on the plurality of persons during a first period of time, wherein the first light is shone with more intensity on the first person in the first row seat of the vehicle than the second person in the second row seat of the vehicle;
    capturing a first image of the plurality of persons during the first period of time;
    terminating the shining of the first light on the plurality of persons after the capturing of the first image;
    shining a second light on the plurality of persons during a second period of time after the terminating, wherein the second light is shone with more intensity on the second person in the second row seat of the vehicle than the first person in the first row seat of the vehicle;
    capturing a second image of the plurality of persons during the second period of time;
    determining that the first person is in the first row seat of the vehicle and the second person is in the second row seat of the vehicle based on one or more brightness differences of the first person and the second person in the first image and the second image;
    in response to the determining, extracting a first final image of the first row of the vehicle including the first person from the first image, and excluding the second row of the vehicle having the second person from the first image; and
    in response to the determining, extracting a second final image of the second row of the vehicle including the second person from the second image, and excluding the first row of the vehicle having the first person from the second image.

2. The image capturing method of claim 1, further comprising:
    applying an image recognition to the first final image to extract a facial portion of the first person.

3. The image capturing method of claim 2, wherein the applying of the image recognition comprises processing the optimal image through a facial recognition system.

4. The image capturing method of claim 2, wherein prior to capturing the first image, the method further comprises shining a third light to illuminate background elements in a first color hue for the first image, and wherein prior to capturing the second image, the method further comprises shining a fourth light to illuminate the background elements in a second color hue for the second image.

5. The image capturing method of claim 4, wherein after capturing the second image, the method further comprises:
    applying a first chroma key using the first color hue on the first image to remove the background elements from the first image; and
    applying a second chroma key using the second color hue on the second image to remove the background elements from the second image.

6. The image capturing method of claim 2 further comprising:
    creating a customized animation using the facial portion of the first person; and
    presenting the customized animation to the first person.

7. The image capturing method of claim 1, wherein the capturing of the first image and the capturing of the second image occur within a same line of sight.

8. The image capturing method of claim 7, wherein the capturing of the first image and the capturing of the second image utilize a beam splitter or an image splitter to provide the same line of sight.

9. The image capturing method of claim 5, wherein the application of the first chroma key further matches the background elements removed from the second image when removing the background elements from the first image, and wherein the application of the second chroma key further matches the background elements removed from the first image when removing the background elements from the second image.

10. A system for capturing images of a plurality of persons having a first person in a first row seat of a vehicle placed a distance from a second person in a second row seat of the vehicle, the system comprising:
    at least one camera;
    at least one light source;
    a control/processing model (CPM) configured to cause:
        the at least one light source to shine a first light on the plurality of persons during a first period of time, wherein the first light is shone with more intensity on the first person in the first row seat of the vehicle than the second person in the second row seat of the vehicle;
        the at least one camera to capture a first image of the plurality of persons during the first period of time;

the at least one light source to terminate the shilling of the first light on the plurality of persons after the capturing of the first image;

the at least one light source to shine a second light on the plurality of persons during a second period of time after the terminating, wherein the second light is shone with more intensity on the second person in the second row seat of the vehicle than the first person in the first row seat of the vehicle;

the at least one camera to capture a second image of the plurality of persons during the second period of time;

determining that the first person is in the first row seat of the vehicle and the second person is in the second row seat of the vehicle based on one or more brightness differences of the first person and the second person in the first image and the second image;

in response to the determining, extracting a first final image of the first row of the vehicle including the first person from the first image, and excluding the second row of the vehicle having the second person from the first image; and in response to the determining, extracting a second final image of the second row of the vehicle including the second person from the second image, and excluding the first row of the vehicle having the first person from the second image.

11. The system of claim 10, wherein the system is further configured to:

apply an image recognition to the first final image to extract a facial portion of the first person.

12. The system of claim 11, wherein the image recognition comprises processing the optimal image through a facial recognition system.

13. The system of claim 11, wherein prior to capturing the first image, the CPM is further configured to cause the at least one light source to illuminate background elements in a first color hue for the first image, and wherein prior to capturing the second image, the CPM is further configured to cause the at least one light source to illuminate the background elements in a second color hue for the second image.

14. The system of claim 13, wherein after capturing the second image, the system is further configured to:

apply a first chroma key using the first color hue on the first image to remove the background elements from the first image; and apply a second chroma key using the second color hue on the second image to remove the background elements from the second image.

15. The system of claim 11, wherein the system is further configured to:

create a customized animation using the facial portion of the first person; and present the customized animation to the first person.

16. The system of claim 10, wherein the at least one camera is configured to capture the first image and the second image within a same line of sight.

17. The system of claim 10, wherein the at least one camera is configured to utilize a beam splitter or an image splitter to provide the same line of sight.

18. The system of claim 14, wherein the first chroma key is further configured to match the background elements removed from the second image when removing the background elements from the first image, and wherein the second aroma key is further configured to match the background elements removed from the first image when removing the background elements from the second image.

* * * * *

UNITED STATES PATENT AND TRADEMARK OFFICE
CERTIFICATE OF CORRECTION

PATENT NO. : 8,885,066 B2
APPLICATION NO. : 12/384125
DATED : November 11, 2014
INVENTOR(S) : Rindfuss et al.

Page 1 of 1

It is certified that error appears in the above-identified patent and that said Letters Patent is hereby corrected as shown below:

In the Claims

Column 13, Line 1, Claim 10 - "shilling" should be --shining--.

Column 14, Line 31, Claim 18 - "aroma key" should be --chroma key--.

Signed and Sealed this
Twenty-fourth Day of February, 2015

Michelle K. Lee
*Deputy Director of the United States Patent and Trademark Office*